United States Patent Office 3,553,332
Patented Jan. 5, 1971

3,553,332
ANTI-TUBERCULAR BENZOPHENONE
DERIVATIVES
Emanuel Grunberg, North Caldwell, N.J., assignor to
Hoffmann-La Roche Inc., Nutley, N.J., a corporation of
New Jersey
No Drawing. Continuation-in-part of application Ser. No.
561,752, June 30, 1966, which is a continuation-in-part
of application Ser. No. 556,268, June 9, 1966. This
application June 27, 1967, Ser. No. 649,124
Int. Cl. A61k 27/00
U.S. Cl. 424—330                                17 Claims

ABSTRACT OF THE DISCLOSURE

Benzophenone derivatives having a di-substituted amino-alkoxy substitutent on one phenyl ring and halo or nitro substituents on the other were found to be useful against mycobacterial infections, particularly Mycobacterium tuberculosis.

This application is a continuation-in-part of application Ser. No. 561,752 filed June 30, 1966, now abandoned, which is in turn a continuation-in-part of application Ser. No. 556,268 filed June 9, 1966, now abandoned.

BRIEF DESCRIPTION OF THE INVENTION

This invention relates to a method of treating mycobacterial infections and to novel pharmaceutical compositions useful therein. More particularly, the present invention relates to a method for the treatment of tuberculosis and to novel antituberculosis compositions containing as active ingredient a substituted benzophenone of the formula

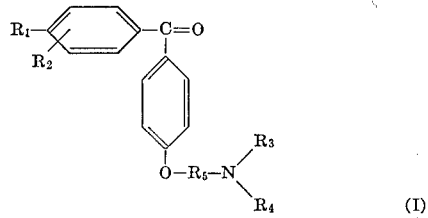

(I)

wherein $R_1$ is bromo, iodo or nitro; $R_2$ is hydrogen or halogen; each of $R_3$ and $R_4$ is independently lower alkyl or lower alkenyl; and $R_5$ is lower alkylene or pharmaceutically acceptable salts thereof.

DETAILED DESCRIPTION OF THE INVENTION

Compounds of Formula I above have been found to be active against mycobacterium, more specifically they have been found to be active against Mycobacterium tuberculosis commonly known as tubercle bacillus, which is the etiologic agent of the infectious disease tuberculosis found in cattle and humans. In animals, compounds of Formula I have demonstrated tuberculostatic properties. Thus a comprehensive embodiment of the present invention comprises the use of a compound of Formula I in the treatment and control of tuberculosis in animals. Compounds of Formula I may also be employed against strains of Mycobacterium tuberculosis which have developed resistance to other anti-tubercular agents.

In another particular embodiment, the present invention comprises pharmaceutical compositions containing as an active ingredient a compound of Formula I in a form suitable for enteral or parenteral administration. In general, compounds of Formula I have been found to be active against Mycobacterium tuberculosis in vivo at doses of about 30 mg./kg. and higher. For example, 4-γ-diethylaminopropoxy-4′-bromo-benzophenone which has an $LD_{50}$ of 450 mg./kg. orally in mice, is active against Mycobacterium tuberculosis in mice at a does of 40 mg./kg. administered in the diet; 4-[2-(diethylamino)ethoxy]-4′-nitro-benzophenone which has an $LD_{50}$ of >900 mg./kg., orally in mice, is active against Mycobacterium tuberculosis in mice at a dose of 31 mg./kg. in the diet. Tests in warm blooded animals thus demonstrate that the compounds of Formula I can be effectively employed in the therapy of tuberculosis in the same general manner as the previously known anti-tubercular agent isoniazid. This latter compound which has an $LD_{50}$ of 203 mg./kg., orally in mice, exhibits activity against Mycobacterium tuberculosis when tested in mice in the same general manner as the compounds of this invention at doses of about 5 mg./kg. in the diet. The compounds of Formula I and pharmaceutical compositions thereof have been shown to have a pattern of activity qualitatively similar to the anti-tubercular agents of known clinical efficacy and are effective as anti-tubercular agents in the treatment of tuberculosis in animals.

A preferred group of anti-tuberculosis agents according to this invention are the compounds of Formula I wherein $R_1$ is bromo, $R_2$ is hydrogen, $R_3$ is lower alkyl, $R_4$ is lower alkyl or lower alkenyl and $R_5$ is ethylene or propylene such that $R_3$ and $R_4$ together contain 3 to 6 carbon atoms and together with $R_5$ contain 7 to 9 carbon atoms and their medicinally acceptable salts, i.e. compounds of the formula

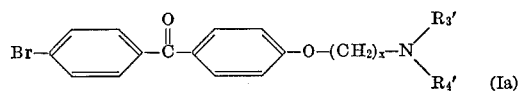

(Ia)

wherein $x$ is the integer 2 or 3; $R_3$ is lower alkyl and $R_4$ is lower alkyl or lower alkenyl such that $R_3'$ and $R_4'$ together contain 3 to 6 carbon atoms and together with the $(CH_2)_x$ group they contain 7 to 9 carbon atoms; and pharmaceutically acceptable acid addition salts thereof. Of particular interest are the compounds of Formula Ia wherein $x$ is 3 and those wherein $R_3$ and $R_4$ are each ethyl, i.e. compounds of the formulas

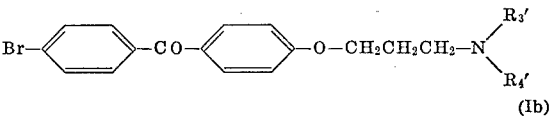

(Ib)

and

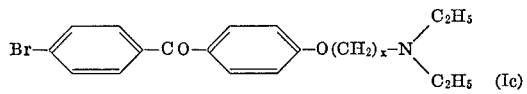

(Ic)

wherein $R_3'$, $R_4'$ and $x$ have the same meaning as hereinabove and their pharmaceutically acceptable acid salts.

Among the specific compounds which according to this invention have been found to be useful as anti-tuberculosis agents there can be named for example the following:

4′-bromo-4-[3-(dipropylamino)propoxy]-benzophenone
4′-bromo-4-[2-(dipropylamino)ethoxy]-benzophenone
4′-bromo-4-[2-(diethylamino)ethoxy]-benzophenone
4-[2-(diethylamino)ethoxy-4′-nitro]-benzophenone
4′-bromo-4-[3-(diethylamino)propoxyl]-benzophenone In general, the compounds of Formula I are readily accessible by a number of alternative routes as outlined in the following schematic diagram:

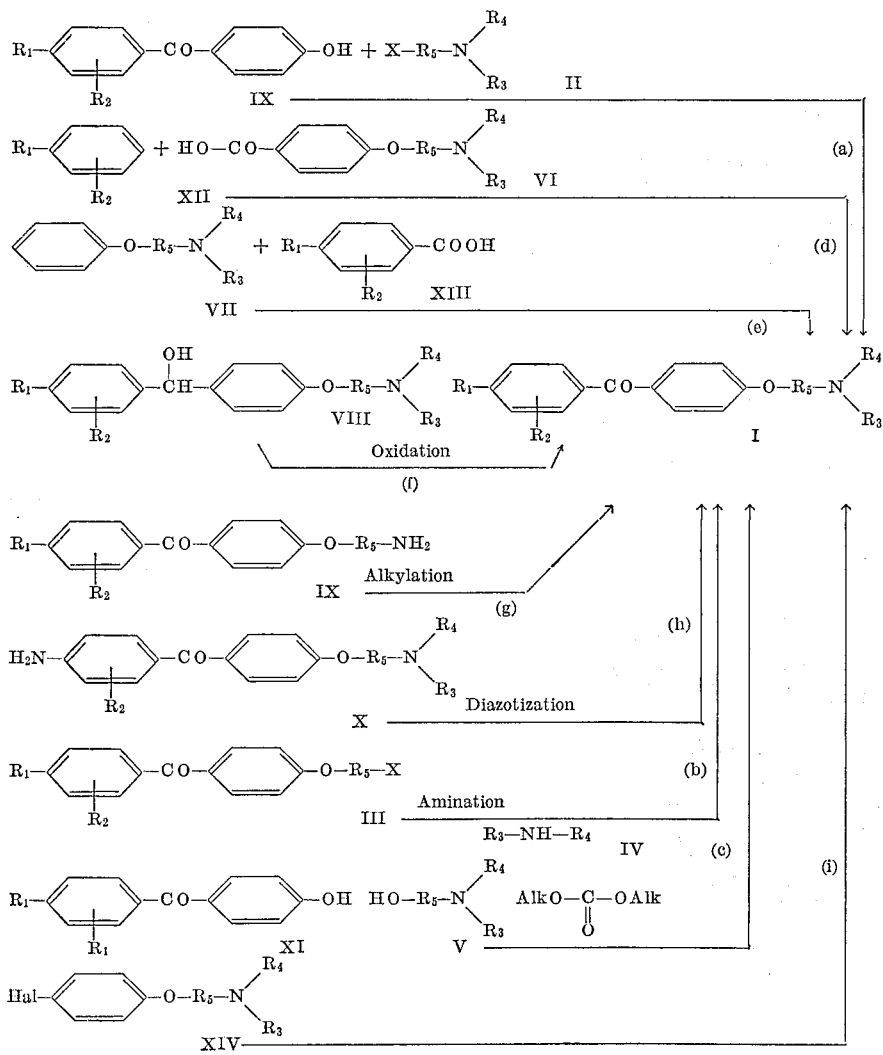

The terms $R_1$, $R_2$, $R_3$, $R_4$ and $R_5$ in the above formulas all have the same meaning as hereinabove and X represents a halogen atom or similar leaving group such as alkylsulfonyloxy or arylsulfonyloxy.

As illustrated by the above reaction schemes, compounds of Formula I can be obtained by (a) condensing a substituted 4-hydroxy-benzophenone derivative of Formula XI with an amine of Formula II; (b) condensing a benzophenone derivative of Formula III with an amine of Formula IV; (c) heating an amine alcohol of Formula V with a 4-hydroxy-benzophenone derivative of Formula XI in the presence of a dialkylcarbonate; (d) reacting a substituted benzene of Formula XII with an acid of Formula VI or an acyl derivative thereof; (e) treating a compound of Formula VII with a substituted benzoic acid of Formula XIII; (f) oxidizing a compound of Formula VIII; (g) alkylating compound of Formula IX; (h) converting a compound of Formula X into the corresponding halo derivative by means of a Sandmeyer reaction; or (i) treating a Grignard derivative of a compound of Formula XIV with p-halo-benzonitrile and hydrolyzing the resulting product, the reactions described above are generally known in the art and techniques for carrying them out will be readily apparent to those skilled in the art from the foregoing descriptions.

The preferred process for the preparation of the benzophenone derivatives employed as the active component of the novel compositions of this invention is the reaction of a 4-hydroxy-benzophenone of Formula XI with an aminoalkyl derivative of Formula II. The 4-hydroxy-benzophenone intermediate of Formula XI suitably as a salt and preferably an alkali metal salt, e.g. a sodium or potassium salt, is condensed with a compound of Formula II for example as the mesylate, tosylate, bromide or particularly as the chloride. The condensation is conveniently carried out in the presence of an inert organic solvent. Suitable solvents are for example the hydrocarbons or the halogenated hydrocarbons, e.g. chlorobenzene, toluene, xylene, the ethers e.g. glycol ether, etc. The alkali metal salt of a compound of Formula XI can be prepared, for example, by the addition of an alkali metal alcoholate such as sodium methylate to a solution of the substituted 4-hydroxy-benzophenone derivative. Alternatively, the condensation can be effected by treating a solution of the substituted 4-hydroxy-benzophenone derivative in an inert solvent such as a ketone e.g. acetone, methylethylketone, etc. with an alkali metal carbonate, e.g. potassium carbonate or sodium carbonate, and an amine of Formula II or an acid addition salt thereof. The condensation reaction is suitably carried out at an elevated temperature, preferably at a temperature between about 40° C. and the boiling point of the reaction mixture. The preferred temperature range is between about 55° and 140° C.

The process for the preparation of the benzophenone derivatives employed in this invention as well as the novel benzophenone derivatives obtained thereby, do not constitute a part of this invention and are given here for the sake of completeness only.

Substituted benzophenones of Formula I which are the active ingredients of the novel compositions of this invention can be employed in the form of their free bases or as medicinally acceptable acid addition salts prepared therefrom. Acid addition salts of the compounds of Formula I can be readily prepared by known techniques with suitable inorganic acids such as for example, hydrochloric, hydrobromic, sulfuric and the like or with suitable organic acids such as benzoic, acetic, tartaric, citric, lactic, oxalic and the like.

As employed throughout this specification the terms halogen, halo, hal, etc. denote all four halogens, viz., chlorine, bromine, iodine and fluorine with chlorine and bromine being preferred. The term lower alkyl denotes a straight or branched chain saturated hydrocarbon containing 1 to 7 carbon atoms such as, methyl, ethyl, propyl, isopropyl, butyl, isobutyl, tertbutyl, etc. The term lower alkenyl denotes straight or branched chain hydrocarbons containing 2 to 7 carbon atoms and a double bond, e.g. allyl, 2-butenyl, 3-butenyl, etc. The term lower alkylene denotes a saturated hydrocarbon chain containing 1 to 7 carbon atoms such as methylene, ethylene, propylene, butylene, etc.

The benzophenone derivatives employed as active ingredients in the compositions of this invention are generally white or yellow crystalline solids which have basic properties and can be conveniently prepared in the form of their acid addition salts. The bases are relatively insoluble in water though soluble in organic solvents such as alcohol and ether. The salts are characteristically crystalline solids soluble in water. Both the base and their acid addition salts are stable under ordinary conditions and suffer no breakdown when formulated into the novel compositions of the invention by the usual techniques for compounding ordinarily employed in the art.

The novel products and processes contemplated by this invention include both enteral and parenteral compositions, e.g. compositions for oral administration, compositions for injection or infusion, suppositories, etc. and methods of administration thereof to animals. The preferred compositions of this invention are the forms suitable for oral administration. Such oral forms are suitably prepared for administration in unit dosage form, such as tablets, pills, capsules, granules and the like. For preparing the solid compositions, such as tablets, the principal active ingredient is mixed with conventional tablet ingredients such as, corn starch, lactose, sucrose, sorbitol, talc, stearic acid, magnesium stearate, dicalcium phosphate and functionally similar materials employed as pharmaceutical diluents or carriers. The tablets or pills of the novel compositions can be laminated or otherwise compounded to provide a dosage form, affording the advantage of prolonged or delayed action or predetermined successive action of the enclosed medication or they can be compounded for instant release of the active ingredient for example, the tablet or pill can comprise an inner dosage and an outer dosage component, the latter being in the form of an envelope over the former. The two components can be separated by an enteric layer which serves to resist disintegration in the stomach thereby permitting the inner component to pass intact into the intestinal tract or simply to be delayed in release. A variety of materials can be used for such enteric layers or coatings; such materials include for example a number of polymeric acids or mixtures of polymeric acids such as, shellac, shellac and cetyl alcohol, cellulose acetate and the like. For oral administration, the active ingredients of Formula I are employed in daily amounts of about 10 mg. to about 250 mg. per kilogram of body weight. A preferred unit dosage form is a tablet containing 10 to 50 mg. of the active benzophenone derivative or its nontoxic salt. Tablets scored to be broken into dosage units or fractional doses, if desired, or a number of tablets to be taken at one time to constitute a dosage unit may also be employed.

A second preferred dosage unit form is a capsule containing from 10 to 50 mg. of the active benzophenone derivative of Formula I or its nontoxic salt. The capsule may be either of the hard or soft shell variety and may be made of any suitable capsule material which will disintegrate in the digestive tract within 1–5 hours. Typical encapsulating materials suitable for use in the practice of this invention are for example, gelatin, methyl cellulose, etc.

The dosage forms of this invention suited to parenteral administration are the liquid forms in which the active benzophenone derivative of Formula I or a salt thereof is incorporated into an aqueous or organic solution by dissolving or suspending in an appropriate solvent which is suitable for parenteral administration. Parenteral compositions are ordinarily formulated with less than the active benzophenone derivatives than in the case of the oral forms. Suitable dosage forms for parenteral administration will ordinarily contain from about .5 to 10 mg. of the active benzophenone of Formula I dissolved or suspended in about 1 cc. of solution suitable for parenteral administration. The parenteral forms can be administered by injection intravenously, intermuscularly, or interpleurally into fistulae or other infected areas or by infusion, e.g. intravenously into infected cavities and pleural spaces.

The suitable daily dose will be about 1 to 15 mg./kg. given in 2 or 3 divided doses. For infusion, the indicated dose is suitably obtained by preparing a solution containing .1 to 10 percent of the active benzophenone of Formula I and administering at a rate of 1 to 5 ml. per minute.

The term "dosage unit form" as employed throughout this specification refers to pharmaceutically discrete units suitable as unitary dosages for mammalian subjects each containing a predetermined quantity of active material calculated to produce the desired therapeutic affect in association with the required pharmaceutical diluent, carrier or vehicle. This invention also comprehends other forms suitable for enteral administration such as, suppositories and also aerosols for inhalation therapy. The specifications for the novel dosage unit forms of this invention are dictated by the characteristics of the active material and the particular therapeutative affect to be achieved and by the limitations inherent in the art of compounding such an active material for therapeutative use in animals.

The dosage unit forms of this invention containing a benzophenone derivative of Formula I or a pharmaceutically acceptable acid addition salts thereof, may also contain either inert or other medicinally active materials for instance, when the dosage unit form is a tablet or granule there may also be present various binders, fillers or solid carrier or diluent materials. When the dosage unit form is a capsule it may contain in addition to additive or diluent materials a liquid carrier such as a fatty oil. When the dosage unit form is a liquid, it can for example be in sterile aqueous solution or in physiological saline solution and the like. There may also be present regardless of the dosage unit form various flavors and other conventional excipients such as, preservatives, stabilizers, wetting or emulsifying agents, salts for varying the osmotic pressure, buffers and the like. The diluent or carrier materials employed in compounding the pharmaceutical formulations, this invention can be of the organic or inorganic variety ordinarily employed in formulating compositions suitable for enteral or parenteral administration. It will be understood of course, that any materials used in preparing dosage unit forms must be substantially nontoxic in the amounts employed for the administration of the required amount of the benzophenone derivative of Formula I which will ordinarily comprise from about 1 to 50 percent of the dosage form. The novel compositions can include or be administered in conjunction with other antitubercular agents to obtain advantageous combinations of their properties, e.g. they can be administered in combination with such known anti-tubercular agents as isoniazid, p-amino salicyclic acid or streptomycin. When the active ingredients of this invention are administered in conjunction with known anti-tubercular agents, they can be administered by the same or different routes as indicated hereinabove.

As indicated hereinabove, the effective dose of the compounds of Formula I under ordinary circumstances is between about 10 mg. and 250 mg./kg. of body weight. Effective dosages will of course depend in all instances upon the severity and individual characteristics of each case as determined by the prescribed practitioner and upon the use or nonuse of other therapy. It will be understood that dosage forms containing larger or smaller quantities of the active drug ingredient are encompassed by the scope of this invention and that such dosage forms can be administered more or less frequently than indicated heretofore. It will be understood that dosage forms containing inert adjuvants in quantities that are greater or less than those indicated above as well as in the examplars in the examples which follow are also encompassed by this invention.

The novel compositions of this invention as stated above are useful in the treatment of tuberculosis and are highly efficacious in combating tuberculosis infections when administered either orally to the infected subject or administered directly to the locus of infection. In tests on mice, the antituberculous agents of this invention were found to be efficacious when administered in the diet in amounts such that the average daily intake was about 30 mg. to about 200 mg. per kg. of body weight. The test method employed and the results obtained were as follows:

Groups of 8–10 mice are used. There are two control groups, both of which are infected. One of the control groups remains untreated while the second control group is treated with a known active anti-tubercular agent, isonicotinic acid hydrazide. The infection consists of an intravenous injection of a 1:10 dilution in saline of a week old Dubos culture of *Mycobacterium tuberculosis* H 37 RV. Treatment begins immediately after infection and continues daily for 3 weeks. On the twenty-second day, the lungs are removed from each animal and then placed in formaldehyde for 3 to 4 days to make the lesions more pronounced. The lesions are rated from 0 (none) to 4+ (widespread) and the dose necessary to cure 50 percent of the infected animals ($CD_{50}$) is calculated by the method of Reed and Muench, American Journal of Hygiene, 27: 493, 1938.

| Compound | $CD_{50}$ (mg./kg. diet) |
| --- | --- |
| 4-bromo-4' - [2 - (diethylamino)ethoxy]-benzophenone | 78 |
| Do | 90 |
| Do | 69 |
| 4-nitro-4'-[2 - (diethylamino)ethoxy]-benzophenone | 151 |
| 4-bromo-4'-[3 - (diethylamino)propoxy]-benzophenone | 40 |
| 4-bromo-4'-[3-(dipropylamino)propoxy]-benzophenone | 77 |
| 4-bromo-4'-[2 - (dipropylamino)ethoxy]-benzophenone | 420 |

The invention will be more fully understood from the examples which follow. These examples are illustrative of the invention and are not to be construed as limited thereof.

EXAMPLE 1

255 grams of 4-bromobenzoic acid phenyl ester was dissolved in 680 ml. of nitrobenzene and, after the addition of 204 g. of powdered aluminum chloride was heated at 60° for 24 hours. The solution was allowed to cool and then poured on ice-cold 3 N hydrochloric acid and extracted with ether. The ether extract was further washed twice with 2 N hydrochloric acid and thereupon extracted with 7.5 percent caustic soda until the alkaline aqueous solution was no longer colored. The alkaline aqueous extract was acidified with concentrated hydrochloric acid, extracted with ether and the ether phase washed four times with water, dried over sodium sulfate, filtered and evaporated in vacuo. There was thus obtained 4-hydroxy-4'-bromo-benzophenone.

142.4 grams of 4-hydroxy-4'-bromo-benzophenone prepared as above was dissolved by warming in a mixture of 2.8 liters of chlorobenzene and 150 ml. of ethanol. After the addition of 37 g. of sodium methylate, about ⅓ of the solvent mixture was distilled off at normal pressure (distillation was continued until the boiling temperature of the chlorobenzene had been reached) and the reaction mixture was allowed to cool. 110 grams of N-diethylaminoethyl chloride was then added dropwise and upon completion of the addition, the mixture was heated to boiling for 20 hours. The suspension thus obtained was allowed to cool, extracted with methylene chloride and the methylene chloride extract was washed with 2 percent caustic soda and four times with water. After drying over sodium sulfate, the filtered methylene chloride extract was evaporated in vacuo to give 4-[2-di(ethylamino) ethoxy]-4'-bromo-benzophenone, melting at 75–76° C.

EXAMPLE 2

4 - [2 - diethylamino)ethoxy] - 4' - nitro - benzophenone (melting point 89–90° C.) was prepared according to the working instructions given in Example 1 starting from 4-nitro-benzoic acid phenyl ester via 4'-nitro-4-hydroxy-benzophenone (melting point 191–193° C.).

EXAMPLE 3

4 - [3 - (dipropylamino)propoxy] - 4' - bromo - benzophenone (melting point of 63–64°) was prepared by dissolving 3-(3-bromo-propoxy)-4'-bromobenzophenone in dipropylamine and heating on a vapor bath for about 4 hours. The reaction mixture was concentrated by evaporation and the residue treated with 3 N sodium carbonate solution and ether. The ether layer was separated, washed with sodium carbonate solution and further dried over sodium sulfate and evaporated to dryness to give the desired product.

EXAMPLE 4

4 - [2 - (dipropylamino)ethoxy] - 4' - bromo - benzophenone (melting point of 78–79° C.) was prepared according to the working instructions of Example 1 starting from 4-hydroxy-4'-bromobenzophenone N-dipropylaminoethyl chloride.

EXAMPLE 5

85.0 grams of 4-hydroxy-4'-bromo-benzophenone was dissolved by warming in a mixture of 1 liter of chlorobenzene and 70 ml. of ethanol. After the addition of 20 grams of sodium methylate, about ⅓ of the solvent mixture was distilled off at normal pressure (until the boiling temperature of the chlorobenzene had been reached) and the reaction mixture was allowed to cool. 61 grams of N-diethylaminopropyl chloride were then added dropwise and, after complete addition, the mixture was heated to boiling for 5 hours. The suspension obtained was allowed to cool, extracted with ether and the ether extract was consecutively washed with two percent caustic soda and four times with water. After drying over sodium sulfate, the filtered ether extract was evaporated in vacuo. The 4-[2-(diethylamino)propoxy]-4'-bromo-benzophenone obtained was purified by crystallization in petroleum ether (boiling range 60 to 90° C.), M.P. 62–63° C.

EXAMPLE 6

The following compositions exemplify pharmaceutical formulations incorporating the novel compounds of this invention.

4-[2-diethylamino)ethoxy]-4'-bromo-benzophenone
Parental formulation

| | | Per cc. |
|---|---|---|
| 4-[2-(diethylamino)ethoxy]-4'-bromo-benzophenone | mg. | 1.0 |
| Propylene glycol | cc. | 0.4 |
| Benzyl alcohol (benzaldehyde free) | cc. | 0.015 |
| Ethanol, U.S.P. | cc. | 0.10 |
| Sodium benzoate | mg. | 48.8 |
| Benzoic acid | mg. | 1.2 |
| Water for injection—Q.s. to 1.0 ml. | | |

PROCEDURE (FOR 10,000 cc.)

(1) The 10 g. of 4-[2-(diethylamino)ethoxy]-4'-bromo-benzophenone were dissolved in 150 cc. of benzyl alcohol; 4,000 cc. of propylene glycol and 1,000 cc. of ethanol were added.

(2) The 12 gm. of benzoic acid were dissolved in the above. The 488 gm. of sodium benzoate dissolved in 3,000 cc. of water for injection were added. The solution was brought up to final volume of 10,000 cc. with water for injection.

(3) The solution was filtered through an 02 Selas candle, filled into suitable size ampuls, gassed with $N_2$ and sealed. It was then autoclaved at 10 p.s.i. for 30 minutes.

Capsule formulation

| | Mg. per capsule |
|---|---|
| 4-[2-(diethylamino)ethoxy]-4'-bromo-benzophenone | 10 |
| Lactose | 173 |
| Corn starch | 37 |
| Talc | 5 |
| Total weight | 225 |

PROCEDURE (1) 4-[2-(diethylamino)ethoxy]-4'-bromo-benzophenone was mixed with the lactose and corn starch in a suitable mixer.

(2) The mixture was further blended by passing through a Fitzpatrick Comminuting Machine with a No. 1A screen with knives forward.

(3) The blended powder was returned to the mixer, the talc added and blended thoroughly. It was then filled into No. 4 hard shell gelatin capsules on a Parke Davis capsulating machine (any similar type machine will do).

Suppository formulation

| | Gm. per 1.3 gm. suppository |
|---|---|
| 4-[2-(diethylamino)ethoxy]-4'-bromo-benzophenone | 0.025 |
| Wecobee M (E. F. Drew Company, 522 5th Ave., New York, N.Y.) | 1.230 |
| Carnauba wax | 0.045 |

PROCEDURE (1) The Wecobee M and carnauba wax were melted in a suitable size glass lined container (stainless steel may also be used), mixed well and cooled to 45° C.

(2) 4-[2-(diethylamino)ethoxy]-4'-bromo-benzophenone, which had been reduced to a fine powder with no lumps, was added and stirred until completely and uniformly dispersed.

(3) The mixture was poured into suppository molds to yield suppositories having an individual weight of 1.3 gms.

(4) They were cooled and removed from molds. The suppositories were individually wrapped in wax paper for packaging (foil may also be used).

Tablet formulation

| | Mg. per tablet |
|---|---|
| 4-[2-(diethylamino)ethoxy]-4'-bromo-benzophenone | 25.0 |
| Lactose, spray dried | 72.0 |
| Corn starch, U.S.P. | 2.0 |
| Calcium stearate | 1.0 |
| Total weight | 100.0 |

PROCEDURE (1) 4-[2-(diethylamino)ethoxy]-4'-bromo-benzophenone, lactose, corn starch and calcium stearate were blended in a suitable mixer.

(2) The powder was compressed on a heavy duty tablet compressing machine and yielded tablet slugs of about 1″ diameter and ¼″ thickness.

(3) The tablet slugs were passed through a suitable comminuting machine and yielded granules of approximately 16 mesh with a minimum of fines.

(4) The granulation was recompressed on a tablet compressing machine using a ¼″ standard concave punch to an average tablet weight of 100 mg.

I claim:

1. A pharmaceutical composition in dosage unit form for the treatment of tuberculosis comprising a pharmaceutical carrier and as active ingredient about 0.5 to about 50 mg. of a compound of the formula

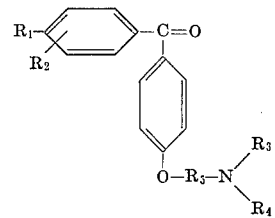

wherein $R_1$ is bromo, iodo or nitro; $R_2$ is hydrogen; each of $R_3$ and $R_4$ is independently lower alkyl or lower alkenyl; and $R_5$ is lower alkylene or a pharmaceutically acceptable salt thereof per dosage unit.

2. A composition according to claim 1 wherein the active ingredient is a compound of the formula

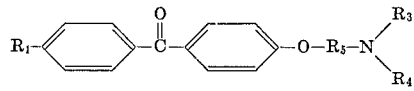

wherein $R_1$ is nitro or bromo and $R_3$ and $R_4$ each individually are lower alkyl or lower alkenyl and $R_5$ is lower alkylene or a pharmaceutically acceptable salt thereof.

3. A composition according to claim 2 wherein the active ingredient is a compound of the formula

wherein X is the integer 2 or 3 and $R_3$ and $R_4$ are each lower alkyl or lower alkenyl.

4. A composition according to claim 3 wherein the active ingredient is a compound of the formula

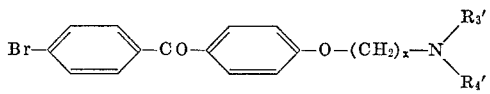

wherein X is the integer 2 or 3, $R_3'$ is lower alkyl and $R_4'$ is lower alkyl or lower alkenyl, such that $R_3'$ and $R_4'$ together contain 3 to 6 carbon atoms and together with the $(CH_2)_x$ group they contain 7 to 9 carbon atoms or a pharmaceutically acceptable salt thereof.

5. A composition according to claim 4 wherein the active ingredient is a compound of the formula

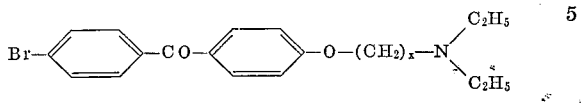

wherein X is the integer 2 or 3 or a pharmaceutically acceptable salt thereof.

6. A composition according to claim 5 wherein the active ingredient is 4-[2-(diethylamino)ethoxy]-4'-bromo-benzophenone.

7. A composition according to claim 5 wherein the active ingredient is 4-[3-(diethylamino)propoxy]-4'-bromo-benzophenone.

8. A composition according to claim 2 wherein the active ingredient is 4-[2-(diethylamino)ethoxy]-4'-nitro-benzophenone.

9. A composition according to claim 4 wherein the active ingredient is 4-[2-(dipropylamino)ethoxy]-4'-bromo-benzophenone.

10. A composition according to claim 4 wherein the active ingredient is 4-[3-(dipropylamino)propoxy]-4'-bromo-benzophenone.

11. A composition according to claim 4 wherein the carrier material is a medicinally acceptable liquid carrier.

12. A composition according to claim 4 wherein the carrier material is a medicinally acceptable solid adjuvant material.

13. A composition according to claim 12 in the form of a unit dosage tablet.

14. A method for the treatment of a warm-blooded animal infected with *Mycobacterium tuberculosis* which comprises administering via enteral or parenteral routes to said warm-blooded animal an antituberculosis effective amount of a compound of the formula

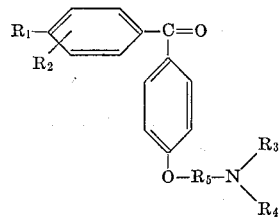

wherein $R_1$ is bromo, iodo or nitro; $R_2$ is hydrogen; each of $R_3$ and $R_4$ is independently lower alkyl or lower alkenyl; and $R_5$ is lower alkylene or a pharmaceutically acceptable salt thereof, together with a carrier therefor.

15. A method according to claim 14 wherein the active ingredient is a compound of the formula

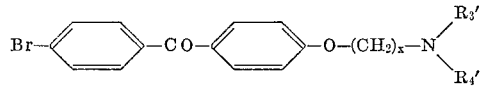

wherein X is the integer 2 or 3, $R_3'$ is lower alkyl and $R_4'$ is lower alkyl or lower alkenyl, such that $R_3'$ and $R_4'$ together contain 3 to 6 carbon atoms and together with the $(CH_2)_x$ group they contain 7 to 9 carbon atoms or a pharmaceutically acceptable salt thereof.

16. A method according to claim 15 wherein the active ingredient is 4-[2-(diethylamino)ethoxy]-4'-bromo-benzophenone or a medicinally acceptable salt thereof.

17. A method according to claim 16 wherein said compound is administered orally.

References Cited

UNITED STATES PATENTS 3,463,861 8/1969 Wilkinson et al. _____ 424—325
3,494,961 2/1970 Ruegg et al. _____ 260—570

JEROME D. GOLDBERG, Primary Examiner

U.S. Cl. X.R.

260—570